(12) United States Patent
Schade et al.

(10) Patent No.: US 12,516,462 B2
(45) Date of Patent: Jan. 6, 2026

(54) DEVICE, HOUSEHOLD APPLIANCE AND METHOD FOR IDENTIFYING SUBSTANCE GROUPS IN A FLUID WITHIN A HOUSEHOLD APPLIANCE

(71) Applicant: emz-Hanauer GmbH & Co. KGaA, Nabburg (DE)

(72) Inventors: Lukas Schade, Nabburg (DE); Daniel Sygnat, Moosbach (DE); Manfredi Signorino, Wackersdorf (DE); Martin Brabec, Nabburg (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 276 days.

(21) Appl. No.: 17/938,412

(22) Filed: Oct. 6, 2022

(65) Prior Publication Data
US 2023/0116485 A1    Apr. 13, 2023

(30) Foreign Application Priority Data
Oct. 7, 2021   (DE) .......................... 102021126051.5

(51) Int. Cl.
*D06F 34/22*   (2020.01)
*A47L 15/42*   (2006.01)
(Continued)

(52) U.S. Cl.
CPC .......... *D06F 34/22* (2020.02); *A47L 15/4297* (2013.01); *D06F 33/37* (2020.02); *D06F 2103/22* (2020.02); *D06F 2105/42* (2020.02)

(58) Field of Classification Search
CPC ... D06F 34/22; D06F 2103/20; D06F 2103/22
See application file for complete search history.

(56) References Cited

U.S. PATENT DOCUMENTS

| | | | |
|---|---|---|---|
| 2007/0046942 A1* | 3/2007 | Ng | G01N 21/251 356/442 |
| 2007/0143933 A1* | 6/2007 | Potyrailo | D06F 34/22 68/12.02 |

(Continued)

FOREIGN PATENT DOCUMENTS

| | | |
|---|---|---|
| DE | 3123613 | 8/1993 |
| DE | 102008056701 | 6/2010 |

(Continued)

OTHER PUBLICATIONS

Official Action with machine translation for German Patent Application No. 102021126051.5, dated Jun. 10, 2022, 16 pages.

*Primary Examiner* — Spencer E. Bell
(74) *Attorney, Agent, or Firm* — Sheridan Ross P.C.

(57) ABSTRACT

Device for detecting substance groups in a fluid within a household appliance, comprising an emission apparatus that emits a first electromagnetic radiation, characterized by an emission spectrum, into a test volume present with the fluid, further comprising a first measuring apparatus that detects a first spectrum of a second electromagnetic radiation led out of the test volume present with the fluid, further comprising an evaluation apparatus that is provided and designed to evaluate the first spectrum, whereby substance groups can be identified by using reference spectra, with the emission spectrum comprising a wavelength range of visible light and infrared radiation.

15 Claims, 3 Drawing Sheets

(51) Int. Cl.
   *D06F 33/37*   (2020.01)
   *D06F 103/22*  (2020.01)
   *D06F 105/42*  (2020.01)

(56) References Cited

U.S. PATENT DOCUMENTS

| | | | |
|---|---|---|---|
| 2018/0156725 A1* | 6/2018 | Kessler | D06F 33/36 |
| 2022/0056627 A1* | 2/2022 | Choi | G01N 15/06 |
| 2024/0197142 A1* | 6/2024 | Bordignon | G01N 21/534 |

FOREIGN PATENT DOCUMENTS

| | | |
|---|---|---|
| DE | 102016210169 | 12/2017 |
| DE | 102019002447 | 9/2020 |

* cited by examiner

DEVICE, HOUSEHOLD APPLIANCE AND METHOD FOR IDENTIFYING SUBSTANCE GROUPS IN A FLUID WITHIN A HOUSEHOLD APPLIANCE

CROSS-REFERENCE TO RELATED APPLICATION

This application claims the benefit of German Application No. 10 2021 126 051.5 filed Oct. 7, 2021, the entire contents of which are incorporated herein by reference in its entirety.

FIELD

The invention relates to a device for detecting substance groups in a fluid within a household appliance. Furthermore, the invention relates to a household appliance comprising such a device and an associated method for identifying substance groups in a fluid within a household appliance and a further method for adapting a cleaning process of a water-conducting household appliance by means of such a device.

BACKGROUND

Such household appliances can be, for example, a refrigerator or a laundry dryer, as well as water-conducting household appliances such as a dishwasher or a washing machine or the like.

The household appliances have at least in common that a fluid is conducted within the household appliance, for example in a respective container apparatus, in inlets and outlets or in bypasses. The container apparatus of a washing machine or a dishwasher would correspond to a suds container in which the objects to be washed are located. Furthermore, the container apparatus could be a drying chamber of a dryer or a cooling space of a refrigerator in which the objects to be cooled are located.

The fluid is in a liquid or a gaseous form. In particular, the main constituent of the liquid fluid is water, primarily tap water. The gaseous fluid is mostly air.

Further substance groups can be present in the fluid in addition to the main constituents water or air. These substance groups are, for example, dissolved or mixed in the fluid, or are present in the fluid as suspended or emulsified substance particles or as aerosol particles.

It is desirable for several reasons to be able to detect the different substance groups in the fluid. The type and degree of soiling can be determined in a dishwasher or in a washing machine, so that measures can be taken to remove the soiling from the objects to be cleaned in the best way possible. However, it is also desirable to detect cleaning agents in the water in order to determine whether they have been removed from the objects to be cleaned at the end of the cleaning process.

At times there will be perishable goods, in particular fruit, vegetables or animal products in a refrigerator. If these products begin to spoil, they will release these substances into the air. It is thus desirable to detect types of substances in the air in refrigerators in order to take appropriate measures.

For water-conducting household appliances there are already devices that detect impurities in the water. In most cases turbidity of the water is detected without the substance groups present in the water being identified. Accordingly, further measures can be adapted or taken to only an insufficient degree.

SUMMARY

Consequently, the object of the present invention is to provide a device, a household appliance and a method which are capable of detecting substance groups in a fluid within a household appliance.

The object is achieved by embodiments of the present disclosure.

According to the invention, a device for identifying substance groups in a fluid within a household appliance is provided. The device comprises at least one emission device, a measuring apparatus and an evaluation apparatus.

The emission system of the device is provided for emitting a first electromagnetic radiation, which is characterized by an emission spectrum, into a test volume in which the fluid with the substance groups found therein is present. According to the invention, the emission spectrum comprises a wavelength range of visible light and of infrared radiation.

Visible light is the electromagnetic radiation that is visible to the human eye. The visible light wavelength range extends approximately from 380 nm to 780 nm.

The infrared radiation extends over a wavelength range from 780 nm to 1 mm and is further subdivided into a near-infrared range of 780 nm to 3 µm, a middle infrared range of 3 µm to 50 µm and a far-infrared range of 50 µm to 1 mm.

Preferably, the emission spectrum essentially comprises all wavelengths in the visible light and infrared radiation range, because this range is particularly suitable for identifying substance groups. The emission spectrum preferably comprises the principal wavelengths or wavelength ranges in the visible and infrared range that are required for the detection of the substance groups. Further preferably, the emission spectrum comprises the wavelengths of the wavelength range from 360 nm to 2500 nm. Alternatively, the emission spectrum comprises the wavelengths of the wavelength range from 360 nm to 1600 nm. Alternatively, the emission spectrum comprises the wavelengths of the wavelength range from 400 nm to 800 nm, and from 900 nm to 2500 nm. Alternatively, the emission spectrum comprises the wavelengths of the wavelength range from 360 nm to 1050 nm. Alternatively, the emission spectrum comprises the wavelengths of the wavelength range from 600 nm to 1050 nm. Preferably, any combination of the wavelength ranges mentioned is conceivable.

Within the meaning of the invention, a spectrum is a frequency spectrum that indicates a composite of different frequencies of the respective electromagnetic radiation and preferably assigns a value of a spectral parameter to each frequency. Spectral information preferably consists of values of a spectral parameter as a function of a wavelength.

The first measuring apparatus is provided and designed to detect a second electromagnetic radiation that is emitted from the test volume. The measuring apparatus is preferably capable of detecting practically all wavelengths from a wavelength range of visible light and infrared radiation. The first measuring apparatus can preferably detect those wavelength ranges that are suitable for the identification of substance groups. Further preferably, the measuring apparatus can also detect wavelengths or wavelength ranges in the ultraviolet range that are suitable for the identification of the substance groups.

The second electromagnetic radiation preferably corresponds substantially to the first electromagnetic radiation plus and/or minus at least a portion of individual wavelengths or a portion of a wavelength range. The first electromagnetic radiation is preferably emitted substantially in a forward direction or in a propagation direction, wherein the electromagnetic radiation is regarded as a light beam. If the propagation direction of the light beam changes, for example due to a deflection or reflection, the forward direction will change in the same way. The second electromagnetic radiation is preferably detected in the forward direction.

The evaluation apparatus is provided and designed to evaluate the first spectrum. The evaluation is preferably carried out by using artificial intelligence and/or machine learning. The evaluation apparatus is connected to the measuring apparatus at least by means of signals, so that at least the detected first spectrum can be transmitted from the measuring apparatus to the evaluation apparatus. Preferably, the spectral measured values of the first spectrum are evaluated. Essential for this principle is that the substance groups to be identified in the fluid produce typical spectral measured values, so-called fingerprints, in the first spectrum. The first spectrum is preferably a transmission spectrum of the fluid in which the substance groups are present. Alternatively, the first spectrum can also be a reflection spectrum.

The respective substance groups can thus be identified by means of reference spectra. In addition to the respective substance group, a concentration, a density or an amount of the substance in the fluid is preferably also identified.

A reference spectrum is preferably produced in advance for each substance group to be detected and/or from a combination of different substance groups, preferably at different temperatures and/or concentrations of the substance groups in the fluid. A reference spectrum which contains substance-specific information preferably exists for each substance group and/or for combinations of different substance groups, as a result of which a typical reference spectrum can be assigned to each substance group, and vice versa. Substance-group-specific information preferably consists of changes in the first spectrum or in the reference spectrum compared to the emission spectrum, in particular "peaks" of the spectral parameter at a wavelength, so-called peak wavelengths, changes in the overall spectrum, changed rises at the edges of frequency bands, ratios of the peak wavelengths, shifts of the peak wavelengths, absorptions and emissions of wavelengths, etc. Reference spectra that essentially contain information about the absorption behavior of a substance group to be detected, as well as reference spectrum that essentially contain information about the scattering radiation behavior of a substance group to be detected are preferred. The same applies to the luminescence behavior.

The first spectrum is evaluated by means of reference spectra. Preferably, at least in a sub-step of the evaluation, the first spectrum, a modified or converted first spectrum or a first spectrum modified by means of a method is compared to the reference spectrum, as a result of which the substance groups to be identified are preferably identified by means of this comparison.

The advantage of the wavelength range, according to the invention, of the emission spectrum of visible light and infrared radiation is that all essential substance groups of dirt, cleaning agents and biological decomposition products can be identified in the fluid. Substance-group-specific measures can thus be taken to improve a cleaning result or freshness.

The identification of the dirt substance groups is advantageous in that the cleaning of the objects to be cleaned can be tailored to the substance groups detected and thus be optimized. As a result, the consumption of electricity, water and cleaning agents can be significantly reduced and the environment can be protected.

The identification of the cleaning agent substance groups is advantageous in that the amount of fresh water needed to rinse the objects to be cleaned can be reduced, because it is possible to reliably determine when the objects to be cleaned are free of cleaning agents.

The identification of biological decomposition products is advantageous in that a subsequent biological decomposition process can be detected even before a foodstuff spoils and thus has to be disposed of.

All of the substance groups to be detected have fingerprints across the entire wavelength range of visible light and infrared radiation. When using a more limited wavelength range than that of the invention it will therefore not be possible to identify all substance groups to be identified, making it impossible to save valuable resources optimally.

The substance groups are preferably grouped according to their chemical compound and recognized by the device. Identifiable dirt substance groups include organic molecules such as fats, proteins, carbohydrates and their decomposition products. Compounds such as inorganic carbon black, lime, minerals and metal compounds, and also cleaning agents, at least comprising anionic and non-anionic surfactants, water softeners, bleaches, enzymes, dirt carriers, salts, core soaps and silicones for example are considered to be inorganic dirt. The emission of a first electromagnetic radiation in the emission spectrum of visible light and infrared radiation makes it, in particular, possible to measure and evaluate in addition all combinations of the substance groups to be identified.

According to a preferred embodiment, the emission spectrum comprises an ultraviolet radiation (UV radiation) wavelength range. The UV radiation extends over a wavelength range from 10 nm to 380 nm, wherein, for the emission spectrum, preferably the wavelength range greater than 200 nm is essential for identifying the substance groups. The emission spectrum thus comprises the wavelength range of visible light and infrared radiation, and preferably the wavelengths of the wavelength range greater than 200 nm to 380 nm. Alternatively, the emission spectrum also preferably comprises the wavelengths of the wavelength range from 200 nm to 300 nm.

Accordingly, the emission apparatus preferably emits the first electromagnetic radiation in the visible range, in the IR range and in the UV range simultaneously. Alternatively, the emission apparatus emits the first electromagnetic radiation in the visible range, in the IR range and in the UV range in staggered intervals and/or successively.

Particularly preferably, the emission apparatus can selectively add wavelengths or wavelength ranges to the emission spectrum or switch them out, in particular the wavelength range of UV radiation. This has the advantage, for example, that wavelengths in the first spectrum, which are produced by fluorescence of the added UV radiation, can be clearly determined and thus the identification of substance groups improved.

According to a preferred embodiment, the first spectrum and the plurality of reference spectra contain spectral information about substance-specific absorption behavior, reflection behavior, scattered radiation behavior or luminescence behavior or any combination thereof.

Each substance group in the fluid has a specific behavior due to the interaction with the first electromagnetic radiation. As part of the absorption, at least a portion of the particles or of the molecules absorbs one or more wavelengths or wavelength ranges at least in part, so that these wavelengths are at least partially filtered out of the first electromagnetic radiation and are thus at least less present in the second electromagnetic radiation. Similarly, at least a portion of the particles or the molecules reflects at least partially one or more wavelengths or wavelength ranges during the reflection.

During the scattering of the first electromagnetic radiation, one or more wavelengths or wavelength ranges are at least partially deflected in their direction by at least a portion of the particles. The scatter radiation behavior depends in particular on the particle size of the substance group to be identified in relation to a respective wavelength. When the diameter of the particle corresponds approximately to the wavelength, this is referred to as a Mie scatter. In the case of a Rayleigh scatter, the diameter of the particle is small compared to the wavelength. It is thus advantageously possible to infer from the detected scattering behavior at least the size of the particle and thus the substance group.

When using luminescence, at least a portion of the particles or of the molecules absorbs one or more wavelengths or wavelength ranges at least partially and emits this supplied energy as electromagnetic radiation, preferably in a different wavelength range from the emitted wavelength range and preferably in the visible range.

According to a preferred embodiment, the emission apparatus comprises at least one emission unit. The preferably one emission unit is designed and provided to emit electromagnetic radiation, wherein the first spectrum comprises a wavelength range of visible light, infrared radiation and preferably UV radiation.

The emission apparatus preferably comprises two, three or more than three emission units. Preferably, the two, three or more than three emission units each have a partial region of the wavelength range that is preferred or that is according to the invention, wherein a wavelength range of visible light, infrared radiation and preferably UV radiation can be imaged by adding the respective partial regions.

The emission unit is preferably a broadband emitter. The emission unit is preferably a broadband LED. The emission unit is preferably a white LED with expanded emission in the IR range and/or in the UV range. The emission unit is preferably a broadband laser. The emission unit is preferably a series ("array") of emitters having different bandwidths. The emission unit is preferably a frequency comb generator. The emission unit is preferably an emitter with an adjustable wavelength or an adjustable wavelength range. The emission unit is preferably a blue LED. Preferably, any combination of the different types of emission units that can image the wavelength range of visible light, infrared radiation and preferably UV radiation can be provided in the emission apparatus.

According to a preferred embodiment, the first electromagnetic radiation can be introduced from the emission unit into the test volume via a first light guide. The second electromagnetic radiation can preferably be discharged from the test volume via a second light guide and can be led into the first measuring apparatus. In particular, the light guides guide the electromagnetic radiation in the wavelength range of visible light, infrared radiation and preferably UV radiation, in particular without any loss, and are accordingly transparent for wavelengths in this wavelength range. The light guides can be designed as fibers, tubes or rods or a combination thereof.

The first measuring apparatus preferably comprises at least one pinhole diaphragm in order to focus the second electromagnetic radiation. Furthermore, the first measuring apparatus comprises a dispersion prism, which is preferably adjustable. Alternatively, the first measuring apparatus preferably comprises an optical grating, which can be flat or arched or curved. The dispersion prism as well as the optical grating are designed to spatially fan out or split the first spectrum on the basis of its wavelengths. This principle is based on a diffraction of the electromagnetic wavelengths as a function of the wavelength.

Furthermore, the first measuring apparatus comprises at least one sensor unit or a detector unit. The sensor unit is preferably a single sensor. Further preferably, the sensor unit comprises a series ("array") of sensors.

According to a preferred embodiment, the first light guide and the second light guide are formed at least in the test volume in a rod-like manner along a longitudinal direction and arranged in parallel to one another. Rod-like means that the light guides are fixed or stiff and that they are significantly longer in the longitudinal direction than in a transverse direction. The first electromagnetic radiation preferably propagates in the first light guide along the longitudinal direction.

The first electromagnetic radiation is preferably totally reflective into the test volume fluid at a first distal end of the first light guide. The total reflection is preferably ensured by the fact that the first electromagnetic radiation is completely reflected at the surface of an optically denser medium to an optically thinner medium from a physically related critical angle, wherein the light guides consist of the optically dense medium and the fluid consists of the optically thin medium.

The first electromagnetic radiation preferably transitions, due to the interaction with the fluid, along a test path in the test volume into the second electromagnetic radiation. The interaction is preferably characterized by an absorption, reflection, scattering and luminescence of the first electromagnetic radiation with the fluid. An interaction of the first electromagnetic radiation with particles or molecules of the substance groups to be detected preferably takes place.

The second electromagnetic radiation preferably substantially corresponds to the first electromagnetic radiation, which, however, differs due to the interaction of the first electromagnetic radiation with the particles of the substance groups in the fluid.

The second electromagnetic radiation is preferably totally reflective at a second distal end of the second light guide in an opposite direction to the longitudinal direction. The total reflection is preferably ensured by the second electromagnetic radiation on the surface being fully reflected by the optically denser medium of the second light guide to the optically thinner medium of the fluid. Details will be explained with reference to the figures. Alternatively, the surface can be a mirror surface.

According to a preferred embodiment, the device comprises at least one second measuring apparatus for detecting at least one second spectrum of a third electromagnetic radiation away from the forward direction of the first or second electromagnetic radiation.

The at least one second measuring apparatus preferably comprises a pinhole diaphragm, an optical grating or a dispersion prism, as well as a sensor unit. The at least one second measuring apparatus can preferably be equipped with all the features described above in the context of the first measuring device either individually or in combination with one another.

The at least one second measuring apparatus preferably detects at least part of the third electromagnetic radiation at a certain angle to the forward direction, the angle being, for example, 15°, 30°, 45°, 60°, 90°, 120° or any angle greater than 0° and less than 180°.

More preferably, more than one second measuring apparatus is present, the respective second measuring apparatuses preferably being able to detect the second spectra of the third electromagnetic radiation at in each case a different angle. For example, three second measuring apparatuses can detect the second spectra of the third electromagnetic radiation at an angle of 30°, 90° and 120°. By detecting more than one second spectrum, information about the geometric distribution of the laterally scattered radiation can thus advantageously be obtained as well. Knowledge about the geometric distribution of the laterally scattered radiation is advantageous in that conclusions about the size of the particles of the substance groups can be drawn therefrom and thus contribute to the identification of the respective substance group.

The third electromagnetic radiation is preferably generated by scattering the first electromagnetic radiation at the substance groups to be identified. The third electromagnetic radiation away from the forward direction corresponds to a laterally scattered radiation that results from the scattering of the first electromagnetic radiation with particles of the substance groups in the fluid. The laterally scattered radiation depends on various factors, in particular the wavelength of the first emitted electromagnetic radiation and the particle size of the substance groups and the concentration of these in the fluid.

The evaluation device is preferably provided and designed to evaluate the first spectrum and the at least one second spectrum, which makes it possible to identify substance groups by using the reference spectra. Correspondingly, the reference spectra for the first spectrum are present, as well as in each case the reference spectra of the substance groups to a respective second spectrum at a respective angle to the forward direction.

Advantageously, substance groups can be better identified from the combination of the evaluations of the first spectrum and a second spectrum. Further advantageously, the identification of the substance groups can be improved even more from the combination of the evaluation of the first spectrum with more than one second spectrum, in that substance groups can also be identified due to the geometric distribution of the laterally scattered radiation.

In addition, the device can comprise optical filters, wavelength-dependent optical filters, tunable filters and/or polarizers, which are preferably part of the first and/or second measuring apparatuses.

According to a preferred embodiment, the evaluation of the first spectrum takes place only in the IR range. The evaluation is carried out by the evaluation apparatus that has received the first spectrum from the first and/or at least one second measuring apparatus. According to one further preferred embodiment, the evaluation takes place only in the visual range and according to another preferred embodiment only in the UV range. The first spectrum is preferably evaluated from a combination of the IR range, the visible range and the UV range. It is desirable for the evaluation of the first spectrum to take place in a wavelength range from 200 nm to 10000 nm.

It is advantageous if, for example, at the beginning of a washing cycle of a washing machine or a dishwasher after the first rinse cycle without cleaning agents, the first spectrum is evaluated only in such wavelength ranges in which dirt molecules such as carbohydrates, fats and proteins and their decomposition products, and also inorganic dirt molecules, can be detected. Furthermore, it is advantageous if, for example, at the end of a wash cycle, the first spectrum is evaluated in particular in such wavelength ranges in which cleaning agents can be detected.

The object is further achieved by the subject-matter of claim 9.

According to the invention, a household appliance is provided which comprises a device according to any one of claims 1-8 and at least one control apparatus, wherein the control apparatus is signaling connected to the evaluation apparatus, wherein the control apparatus controls further apparatuses of the household appliance on the basis of the detected substance groups.

The household appliance is, for example, a washing machine, a dishwasher, a dryer, a refrigerator or another similar household appliance.

The control apparatus is preferably a separate apparatus within the household appliance. Further preferably, the control apparatus is integrated into a higher-level control device.

Preferably, a data connection exists between the control apparatus and the evaluation apparatus, with the evaluation apparatus transmitting data to the control apparatus about the respective detected group and the respective detected concentration of the detected substances. A measure which the control apparatus is intended to carry out is preferably pre-programmed for each detected substance group, preferably for each combination of detected substance groups. According to the invention, the control of other apparatuses of the household appliance corresponds to these measures.

According to a preferred embodiment, the evaluation apparatus is able to retrieve the reference spectra from a memory unit. Alternatively or cumulatively, a server can retrieve the reference spectra by means of a wireless connection, the server preferably not being part of the household appliance. Accordingly, the household appliance has an interface for communicating with the server.

According to a preferred embodiment, the main component of the fluid is air. Such a household appliance is preferably a dryer or a refrigerator.

Depending on the detected substance groups the control apparatus can preferably be an air filter device. In the air within the cooling space of a refrigerator, for example, biological decomposition products are found that arise during ripening, withering or decomposition. The detected substance groups are detected by the evaluation apparatus and sent to the control apparatus. The control apparatus can then activate the air filter device. This has the advantage that, depending on the substance groups detected, these can be filtered out of the air and thus not impact other perishable foods.

Alternatively and cumulatively, the control apparatus can control an air treatment device. The air in a dryer can thus be conditioned, for example.

Alternatively and cumulatively, the control apparatus can control a communication apparatus which can transmit information to a user. The communication apparatus can, for example be a display on the household appliance, for example the refrigerator, or even a unit that transmits a message to a device of a user. If, for example, a process of decay is occurring, the user can be notified via the communication apparatus.

According to an alternatively preferred embodiment, the main component of the fluid is water. Such a household appliance is preferably a washing machine or a dishwasher. In addition to the main component water, in particular cleaning agents and impurities or dirt are present in the fluid.

The control apparatus can preferably control a metering apparatus for cleaning agents depending on the detected substance groups, and said metering device can add a type, a composition and/or an amount of the cleaning agent to the water. In particular, the cleaning agent is adapted in such a way that the detected impurities can be eliminated in the best possible manner. The cleaning agent is in particular composed of a plurality of components, wherein each individual component can eliminate a specific substance group, for example fats, proteins, carbohydrates or inorganic contaminants. If, for example, the fluid predominantly contains fats, the component that can remove fat from the objects to be cleaned will be predominantly added to the cleaning agent as well.

Alternatively and cumulatively, the control apparatus can control a supply apparatus that can supply a quantity of water to the cleaning process at a certain time or during a certain time period. If, for example, the evaluation apparatus recognizes that the concentration of soiling substance groups is low, a quantity of water can advantageously be saved. Further opportunities to save water arise at the end of the washing or rinsing process. The aim here is to remove the cleaning agents from the objects to be cleaned by rinsing the objects with fresh water. In the prior art this quantity of fresh water is excessive, since with no identification of the cleaning agents it must be ensured that the objects to be cleaned are substantially free of cleaning agents. The advantage of this preferred embodiment is accordingly that the supply of fresh water can be limited as soon as it is detected that the fluid is substantially free of cleaning agents.

Alternatively and cumulatively, the control apparatus can control an adjustment apparatus that can select and set a cleaning program from a plurality of cleaning programs. The cleaning programs preferably differ by a cleaning duration, the cleaning temperature and cleaning cycles such as the pre-wash cycle, main wash cycle, post-wash cycle, etc. By selecting the cleaning program on the basis of the detected substance groups, valuable resources such as energy and time can advantageously be saved in addition to water and cleaning agents.

According to a preferred embodiment, the test volume of the device is located in a machine sump of the washing machine or the dishwasher. Alternatively, the test volume is located in a fluidically separable bypass.

The object is further achieved by the method of claim 14. The method can have all the features already described above in the context of the device and of the household appliance individually or in combination with one another and vice versa.

According to the invention, a method for detecting substance groups in a fluid within a household appliance is provided, said method comprising the following method steps:
 a. Emitting by means of an emission apparatus a first electromagnetic radiation, characterized by an emission spectrum, into a test volume filled with the fluid;
 b. Detecting by means of a first measuring apparatus a first spectrum of a second electromagnetic radiation derived from the test volume;
 c. Evaluating by means of an evaluation apparatus the first spectrum thereby obtaining an absorption spectrum and thereby obtaining a scatter spectrum;
 d. Detecting by means of the evaluation apparatus the substance groups from the scatter spectrum and/or the absorption spectrum using a plurality of reference spectra,
wherein the emission spectrum comprises a visible light wavelength range and an infrared radiation wavelength range.

The first spectrum preferably shows a spectral parameter of the respective wavelength. The spectral parameter preferably corresponds to an intensity or to a beam density, whereby any other spectral parameter that at least indicates how much of the observed wavelength is detected or emitted is also possible.

The first spectrum of the second electromagnetic radiation is preferably detected in the forward direction of the first electromagnetic radiation. Consequently, the first spectrum contains at least information about the interaction of the first electromagnetic radiation with the substance groups in the fluid, with the interaction substantially corresponding to an absorption and a scatter. All of the interactions already mentioned are preferably also taken into account in the evaluation.

According to a preferred embodiment, the evaluation of the first spectrum according to method step c comprises the method steps of:
 i. Normalizing the first spectrum to obtain a normalized spectrum of the substance groups;
 ii. Determining a combined absorption and scatter spectrum from the normalized spectrum;
 iii. Separating the combined absorption and scatter spectrum to obtain the absorption spectrum and the scatter spectrum.

The first spectrum is preferably normalized by using a reference spectrum. The reference spectrum is preferably a transmission spectrum of the fluid, with the emission spectrum being emitted into the fluid and the fluid being substantially free of cleaning agents, impurities or dirt. The transmission spectrum is preferably that of pure water or fresh water or tap water or fresh air. This reference spectrum is already present in the method since it was detected and recorded in advance, for example in a laboratory. The first spectrum preferably corresponds substantially to a transmission spectrum of the fluid, with the substance groups to be detected being present in the fluid. Alternatively, the first spectrum and the reference spectrum can be a reflection spectrum.

The first spectrum is preferably normalized by dividing the spectral parameters of a respective wavelength of the first spectrum by the spectral parameters of the same wavelength of the reference spectrum.

A combined absorption and scattering spectrum is preferably obtained by subtracting from one the spectral parameters of a respective wavelength of the standardized spectrum. The combined absorption and scattering spectrum essentially contains spectral information about the substance-specific absorption and scatter behavior, said information initially not yet being differentiable.

For the separation, a suitable fitting function is preferably applied to the spectral line of the combined absorption and scatter spectrum in a wavelength range from which it can be assumed that little to no absorption of the electromagnetic radiation by the substance group particles occurs in this wavelength range. This wavelength range corresponds to a range from 500 nm to 1000 nm, for example.

Particularly preferred is the suitable fitting function $f$ provided by the formula:

$$f(\lambda) = f_0 + a * \left(\frac{\lambda}{\lambda_0}\right)^b$$

The parameter $\lambda$ corresponds to the wavelength, with the wavelength being the run parameter of the function. The value $\lambda_O$ preferably corresponds to a lower limit of the wavelength range, in which it is assumed that little to no absorption occurs, for example $\lambda_O=500$ nm. The value $\lambda_O$ can be defined otherwise as well. The parameters $f_0$, a and b are fitting parameters that must be determined for every combined adsorption and scatter spectrum. Preferably, the parameters a and b are less than one. The respective value of the fitting function $f$ for each wavelength corresponds to a respective spectral parameter.

The fitting function is preferably extrapolated over the entire wavelength range of the absorption and the scatter spectrum.

The fitting function preferably corresponds to the scatter spectrum of the substance groups to be identified.

The absorption spectrum is preferably obtained by subtracting the values of the fitting function of a respective wavelength from the value of the spectral parameter of the same wavelength of the combined absorption and scatter spectrum.

The substance groups are preferably detected according to method step d by comparing the absorption spectrum with a plurality of absorption reference spectra. Alternatively or cumulatively, the substance groups are recognized by the evaluation apparatus comparing the scatter spectrum with a plurality of scatter reference spectra. The combination of comparisons is particularly advantageous.

Furthermore, a method is claimed to solve the problem. The method can have all the features already described above in the context of the device, the household appliance and the method, individually or in combination with one another, and vice versa.

According to the invention, the method for adapting a cleaning process of a water-conducting household appliance according to claim 12 or 13 on the basis of detected substance groups in the water of the household appliance comprises the method steps of claim 14 or 15, as well as at least one of the following method steps:

e. Controlling the cleaning agent metering apparatus by means of the control apparatus, which can supply a type, a composition and/or a quantity of the cleaning agent to the water;

f. Controlling the supply apparatus by means of the control apparatus, which can supply a quantity of water;

g. Controlling the adjustment apparatus by means of the control apparatus, which can set a cleaning program selected from a plurality of cleaning programs.

Further advantages, aims and properties of the present invention are explained with reference to the following descriptions of the attached figures. Similar components can have identical reference signs in the various embodiments.

DETAILED DESCRIPTION

Figure 1:
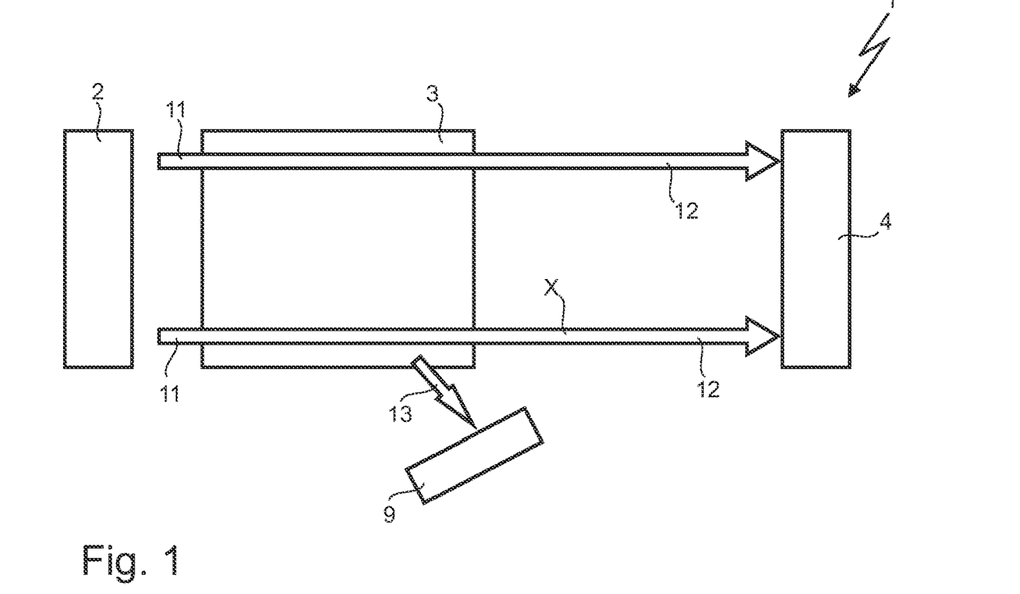
FIG. 1 is a schematic diagram of a device according to one embodiment.

FIG. 1 is a schematic diagram of a device 1 according to one embodiment. An emission apparatus 2 emits a first electromagnetic radiation 11 in a forward direction X into a test volume 3, wherein the first electromagnetic radiation 11 is characterized by an emission spectrum. A fluid is present in the test volume 3, said fluid containing substance groups which can be identified by the device 1. Due to the interaction of the first electromagnetic radiation 11 with particles of the substance groups, the first electromagnetic radiation 12 transitions into the second electromagnetic radiation 12.

The second electromagnetic radiation 12 directed in the forward direction X and guided out of the test volume 3 is detected by a first measuring device 4, said second electromagnetic radiation 12 being characterized by a first spectrum. The basic structure of the device shown in FIG. 1 corresponds to the basic structure of an absorption or transmission spectroscopy. A reflection spectroscopy is however also conceivable.

Aside from the forward direction X, a third electromagnetic radiation 13 can be detected by at least one second emission apparatus 9, wherein the third electromagnetic radiation 13 arises in the fluid with the particles of the substance groups due to a lateral scattering of the first electromagnetic radiation 11. By means of the second measuring apparatus 9, a second spectrum of the third electromagnetic radiation 13, as well as information relating to the geometry of the scatter radiation, can thus advantageously be detected, which is preferably characteristic of the size of a particle of a substance group.

An evaluation apparatus 5 (not shown in FIG. 1) is signaling connected to the first measuring apparatus 4 and to at least one second measuring apparatus 9, wherein the first measuring apparatus 4 and/or the second measuring apparatus 9 transmit the detected spectra to the evaluation apparatus 5.

Figure 2:
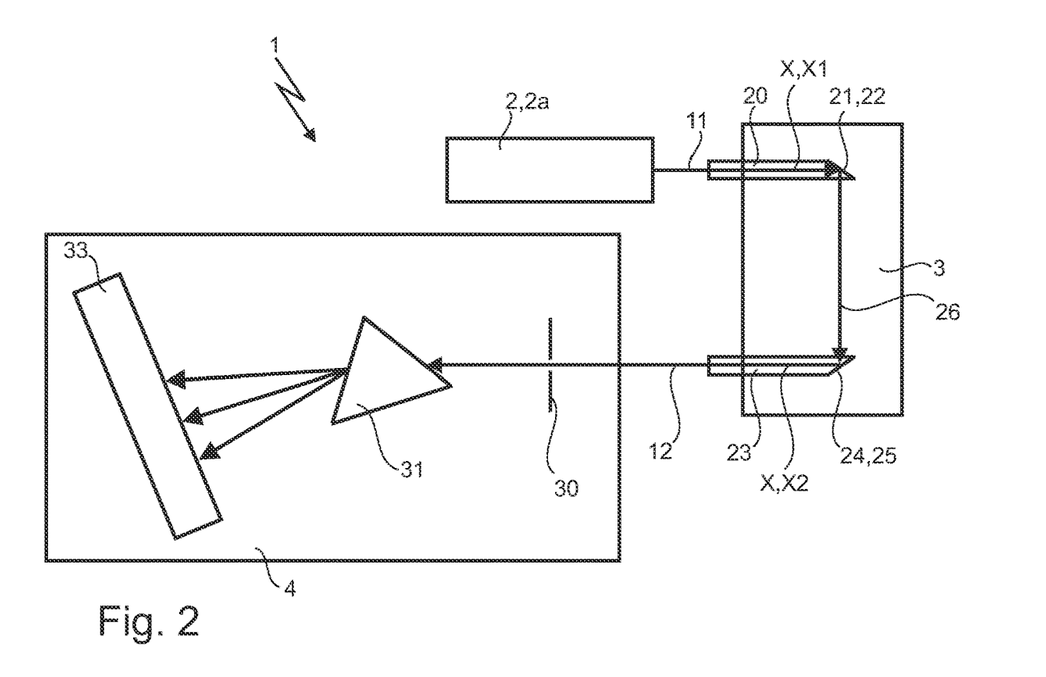
FIG. 2 is a schematic representation of a device according to a preferred embodiment with a dispersion prism.

FIG. 2 is a schematic representation of a device 1 according to a preferred embodiment with a dispersion prism 31. The emission apparatus 2, which comprises at least one emission unit 2a, emits the first electromagnetic radiation 11 via a first light guide 20 into the test volume 3. The second electromagnetic radiation 12 is led out of the test volume 3 via the second light guide 23. For optical focusing purposes, the second electromagnetic radiation 12 passes through a pinhole diaphragm 30 and is subsequently optically fanned out by the dispersion prism 31. A sensor unit 33 of the first measuring apparatus 4 detects the respective wavelengths of the optically fanned-out third electromagnetic radiation 12.

The first light guide 20 and the second light guide 23 are formed at least partially in a rod-like manner along a longitudinal direction X1 and are arranged parallel to one another. The light guides 20, 23 each have a distal end 21, 24, wherein the surfaces 22, 25 of the distal ends 21, 24 are each beveled by 45 degrees to the longitudinal direction X1. The first electromagnetic radiation 11 propagating in the first light guide 20 in the longitudinal direction X1 is deflected by a total reflection at the first surface 22 of the first distal end 21 of the first light guide 20, preferably by 90 degrees. The deflected first electromagnetic radiation 11 then enters the fluid in the test volume 3 perpendicularly through a lateral surface of the first light guide 20. The first electromagnetic radiation 11 transitions into the second electromagnetic radiation 12 along a test path 26 in the test volume 3.

The second electromagnetic radiation 12 enters perpendicularly through a lateral surface at the second distal end 24 of the second light guide 23 and is deflected at the second surface by 90 degrees in an opposite direction X2 to the longitudinal direction X1 and then exits the test volume 3.

Figure 3:
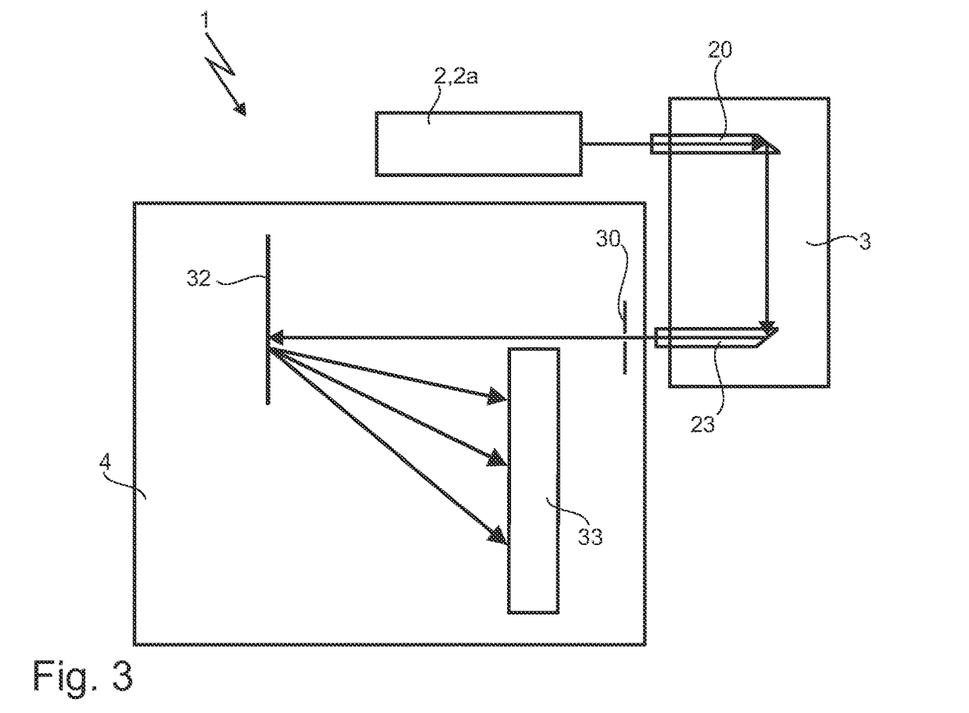
FIG. 3 shows a schematic representation of a device according to a preferred embodiment with an optical grating.

FIG. 3 is a schematic representation of a device 1 according to a preferred embodiment with an optical grating 32 instead of a dispersion prism 31, as shown in FIG. 2. The second electromagnetic radiation 12, which comes into contact with the optical grating 32, is reflected on the basis of the respective wavelength at a respective angle to the sensor unit 33.

Figure 4:
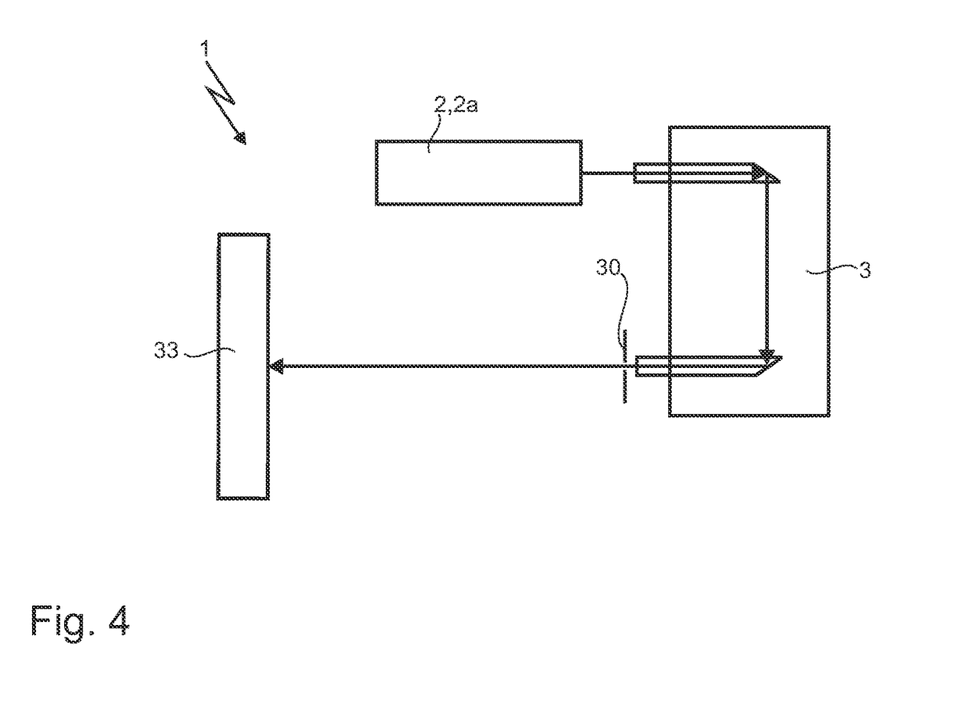
FIG. 4 is a schematic representation of a device according to a preferred embodiment with an emitter having an adjustable wavelength.

FIG. 4 is a schematic representation of a device 1 according to a preferred embodiment with an emitter having an adjustable wavelength as emission unit 2a. Since the respective wavelengths in the wavelength range according to the invention are emitted one after the other, a dispersion prism 31 or an optical grating 32 can be dispensed with.

Figure 5:
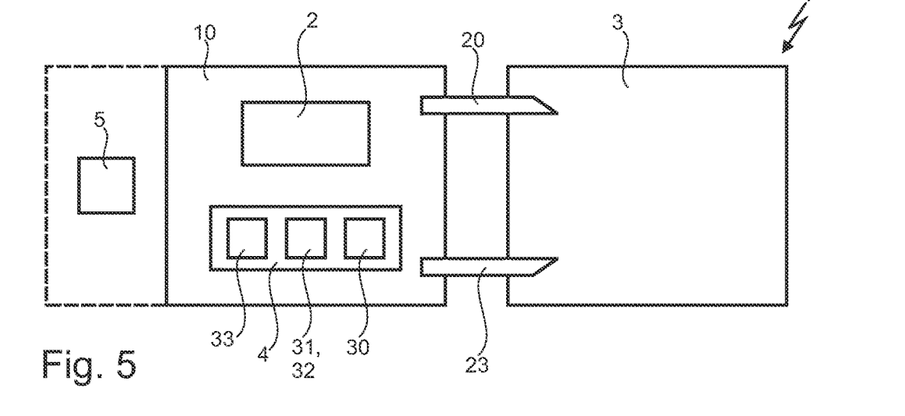
FIG. 5 is a representation of a device according to an embodiment with a component.

FIG. 5 is a representation of a device 1 according to one embodiment. A component 10 comprises the emission apparatus 2 and the first measuring apparatus 4, which in turn comprises the pinhole diaphragm 30, the dispersion prism 31 or the optical grating 32, as well as the sensor unit 33. Furthermore, the component can comprise the first light guide 20 and the second light guide 23. In addition, the component 10 can comprise the evaluation apparatus 5. The component 10 preferably comprises a housing in which the mentioned components are housed. The component 10 has the advantage that it can be attached to a test volume 3 in a simple manner and as a compact unit.

Figure 6:
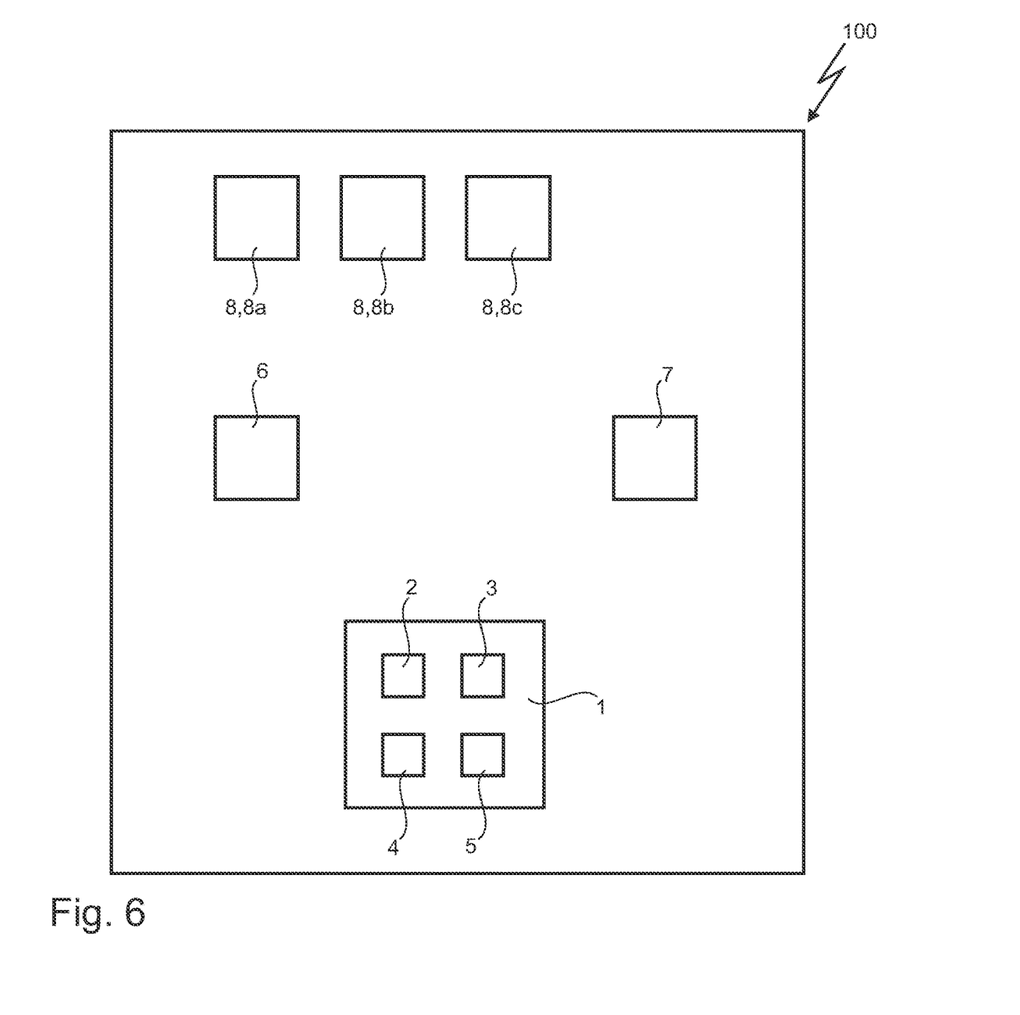
FIG. 6 is a view of a household appliance according to one embodiment.

FIG. 6 is a view of a household appliance 100 according to one embodiment. The household appliance 100 comprises at least the device 1, which in turn comprises the emission apparatus 2, the test volume 3, the first measuring apparatus 4, and the evaluation apparatus 5. Furthermore, the household appliance 100 comprises a control apparatus 6 and a memory unit 7. The control apparatus 6 and/or the memory unit 7 can also be part of the device 1. The washing machine 100 also comprises further apparatuses 8, for example a metering apparatus 8a, a supply apparatus 8b and an adjustment apparatus 8c.

All the features disclosed in the application documents are claimed as essential to the invention provided that they are novel with regard to the prior art individually or in combination.

LIST OF REFERENCE SIGNS

1 Device
2 Emission apparatus
2a Emission unit
3 Test volume
4 First measuring apparatus
5 Evaluation apparatus
6 Control apparatus
7 Memory unit
8 Further apparatuses
8a Metering apparatus
8b Supply apparatus
8c Adjustment apparatus
9 Second measuring apparatus
10 Component
11 First electromagnetic radiation
12 Second electromagnetic radiation
13 Third electromagnetic radiation
20 First light guide
21 First distal end
22 First surface
23 Second light guide
24 Second distal end
25 Second surface
26 Test path
30 Pinhole diaphragm
31 Dispersion prism
32 Optical grating
33 Sensor unit
100 Household appliance
X Forward direction, propagation direction
X1 Longitudinal direction
X2 Opposite direction

What is claimed is:

1. A device for identifying substance groups in a fluid within a household appliance, comprising:
an emission apparatus which emits a first electromagnetic radiation, characterized by an emission spectrum, into a test volume present with the fluid;
a first measuring apparatus that detects a first spectrum of a second electromagnetic radiation directed in a forward direction and led out of the test volume present with the fluid; and
an evaluation apparatus that is provided and designed to evaluate the first spectrum, which makes it possible to identify substance groups by using reference spectra,
wherein the emission spectrum comprises a visible light wavelength range and an infrared radiation wavelength range, and
wherein a plurality of different reference spectra are retrieved by the evaluation apparatus from a memory unit and/or from a server, wherein the reference spectra are produced in advance for each substance group to be detected and/or from a combination of different substance groups, wherein a typical reference spectrum is assigned to each substance group and/or combination of different substance groups, wherein the device further comprises at least one second measuring apparatus for detecting at least one second spectrum of a third electromagnetic radiation away from a forward direction, wherein the third electromagnetic radiation is generated by scattering of the first electromagnetic radiation by the substance groups to be identified, wherein the evaluation apparatus is provided and designed to evaluate the first spectrum and the at least one second spectrum, wherein substance groups can be identified by using a combination of the first spectrum and the at least one second spectrum, wherein the memory unit and/or the server comprise reference spectra for the first spectrum, as well as reference spectra of the substance groups to a respective second spectrum, and wherein the first spectrum is preferably evaluated from a combination of IR range, visible range and UV range.

2. The device according to claim 1, wherein the emission spectrum further comprises a wavelength range of ultraviolet radiation, wherein the wavelength ranges of ultraviolet radiation can be switched on and off.

3. The device according to claim 1, wherein the first spectrum and the plurality of reference spectra include spectral information about substance group-specific absorption behavior, reflection behavior, scattered radiation behavior or luminescence behavior or any combination thereof.

4. The device according to claim 1, wherein the emission apparatus comprises at least one emission unit comprising a broadband emitter.

5. The device according to claim 1, wherein the first electromagnetic radiation can be introduced into the test volume from the emission apparatus via a first light guide, wherein the second electromagnetic radiation can be discharged from the test volume via a second light guide and led into the first measuring apparatus, wherein the first measuring apparatus comprises at least one pinhole diaphragm, a dispersion prism or an optical grating for spatial fanning-out of the first spectrum and at least one sensor unit.

6. The device according to claim 5, wherein the first light guide and the second light guide are formed in a rod-like manner along a longitudinal direction, at least in the test volume, and are arranged in parallel with one another, wherein the first electromagnetic radiation can be totally reflected at a first distal end of the first light guide into the fluid in the test volume, wherein the first electromagnetic radiation transitions into the second electromagnetic radiation due to interaction with the fluid along a test path in the test volume, wherein the second electromagnetic radiation can be totally reflected at a second distal end of the second light guide in an opposite direction to the longitudinal direction.

7. A household appliance comprising a device according to claim 1, and at least one control apparatus that is signaling connected to the evaluation apparatus, the control apparatus controlling further apparatuses of the household appliance depending on the identified substance groups.

8. The household appliance according to claim 7, wherein the reference spectra can be retrieved by the evaluation apparatus from a memory unit and/or from a server by means of a wireless connection.

9. The household appliance according to claim 7, wherein a main component of the fluid is air, wherein the control apparatus, depending on the identified substance groups, controls an air filter device and/or an air treatment device, and/or controls a communication apparatus that can transmit information to a user.

10. The household appliance according to claim 7, in particular a washing machine or a dishwasher, wherein a main component of the fluid is water, wherein the control apparatus, depending on the identified substance groups, controls a metering apparatus for cleaning agents that can add a type, a composition and/or a quantity of the cleaning agent to the water, and/or controls a supply apparatus that can supply a quantity of water, and/or controls an adjustment apparatus that can set a cleaning program selected from a plurality of cleaning programs.

11. The household appliance according to claim 10, wherein the test volume of the device is in a machine sump or in a fluidically separable bypass.

12. A method for adapting a cleaning process of a water-conducting household appliance according to claim 10 on the basis of identified substance groups in the water of the household appliance, as well as at least one of the following method steps:

e. Controlling the metering apparatus for cleaning agents by means of the control apparatus, which can supply a type, a composition and/or a quantity of the cleaning agent to the water;

f. Controlling the supply apparatus by means of the control apparatus, which can supply a quantity of water;

g. Controlling the adjustment apparatus by means of the control apparatus, which can set a cleaning program selected from a plurality of cleaning programs.

13. The device according to claim 1, wherein the second measuring apparatus detects information relating to a geometry of the scattering of the first electromagnetic radiation that generated the third electromagnetic radiation.

14. The device according to claim 1, wherein the first measuring apparatus includes a dispersion element and a detector unit having an array of sensors.

15. The device according to claim 1, wherein the emission apparatus comprises at least one emission unit comprising a white LED with an expanded emission in the IR range or the UV range.

* * * * *